United States Patent
Matsumura et al.

(10) Patent No.: US 12,389,395 B2
(45) Date of Patent: Aug. 12, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 403 days.

(21) Appl. No.: 17/923,392

(22) PCT Filed: May 7, 2020

(86) PCT No.: PCT/JP2020/018563
§ 371 (c)(1),
(2) Date: Nov. 4, 2022

(87) PCT Pub. No.: WO2021/224965
PCT Pub. Date: Nov. 11, 2021

(65) Prior Publication Data
US 2023/0199763 A1    Jun. 22, 2023

(51) Int. Cl.
*H04W 72/1273* (2023.01)
*H04L 5/00* (2006.01)
*H04W 72/23* (2023.01)

(52) U.S. Cl.
CPC ....... *H04W 72/1273* (2013.01); *H04L 5/0051* (2013.01); *H04W 72/23* (2023.01)

(58) Field of Classification Search
CPC ... H04L 5/0023; H04L 5/0044; H04L 5/0051; H04L 5/0094; H04W 16/28; H04W 72/1273; H04W 72/23; H04W 72/232
See application file for complete search history.

(56) References Cited

U.S. PATENT DOCUMENTS

| 2021/0022144 A1 | 1/2021 | Shi et al. |
| 2021/0219327 A1 | 7/2021 | Jiang et al. |
| 2024/0259078 A1* | 8/2024 | Gao ............ H04W 16/28 |

FOREIGN PATENT DOCUMENTS

| CN | 110351850 A | 10/2019 |
| CN | 110535590 A | 12/2019 |

OTHER PUBLICATIONS

Office Action issued in counterpart Chinese Application No. 202080102608.9, mailed Aug. 9, 2024 (16 pages).

(Continued)

*Primary Examiner* — Mansour Oveissi
(74) *Attorney, Agent, or Firm* — Osha Bergman Watanabe & Burton LLP

(57) ABSTRACT

A terminal according to an aspect of the present disclosure includes: a receiving section that receives information indicating a plurality of transmission configuration indication (TCI) states for a same demodulation reference signal (DMRS) port for physical downlink shared channel (PDSCH); and a control section that determines, based on downlink control information, at least one of a TCI state and resource allocation of each of a plurality of PDSCHs that carry same downlink data. According to an aspect of the present disclosure, it is possible to appropriately receive downlink data from a plurality of transmission points.

8 Claims, 10 Drawing Sheets

TCI STATE ACTIVATION/DEACTIVATION MAC CE

| R | Serving Cell ID | BWP ID | OCTET 1 |
| $C_0$ | TCI state $ID_{0,1}$ | | OCTET 2 |
| R | TCI state $ID_{0,2}$ | | OCTET 3 (Optional) |

| $C_N$ | TCI state $ID_{N,1}$ | | OCTET M-1 |
| R | TCI state $ID_{N,2}$ | | OCTET M (Optional) |

(56) References Cited

OTHER PUBLICATIONS

Office Action issued in counterpart Japanese Application No. 2022-519860, mailed Apr. 23, 2024 (9 pages).
3GPP TS 38.214 V16.0; "3rd Generation Partnership Project; Technical Specification Group Radio Access Network; NR; Physical layer procedures for data (Release 16)", Mar. 2020; Sophia Antipolis Valbonne, France (151 pages).
LG Electronics: "Comparison between multi-TRP schemes for improving reliability", 3GPP TSG RAN WG1 #96bis, R1-1904215; Xi'an, China, Apr. 8-12, 2019 (5 pages).
International Search Report issued in PCT/JP2020/018563 on Nov. 24, 2020 (2 pages).
Written Opinion of the International Searching Authority issued in PCT/JP2020/018563 on Nov. 24, 2020 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

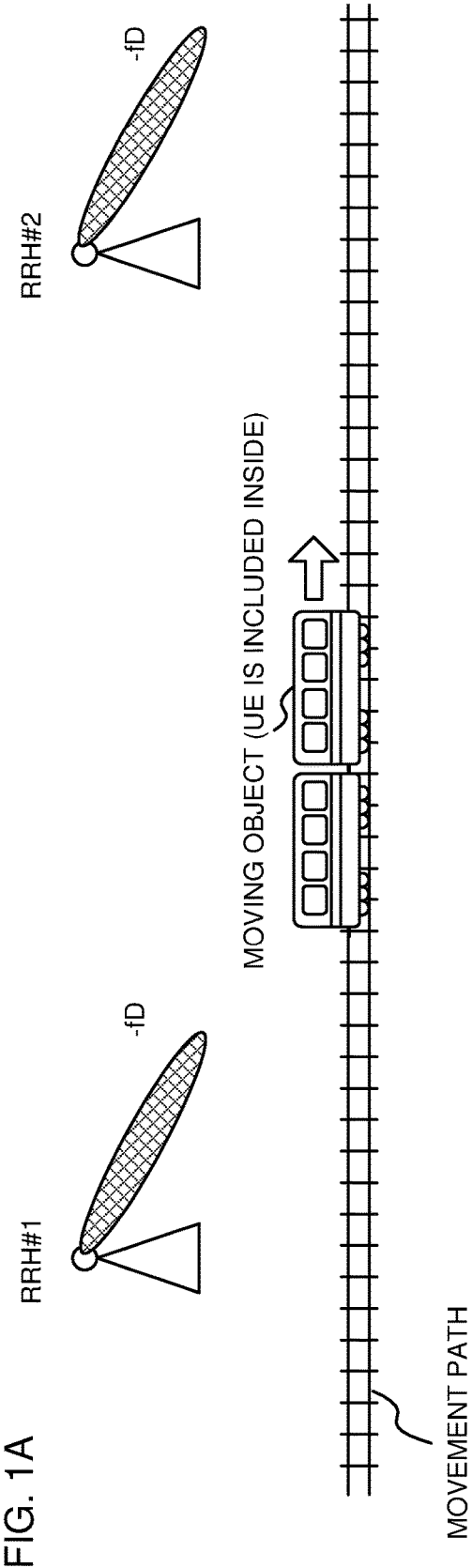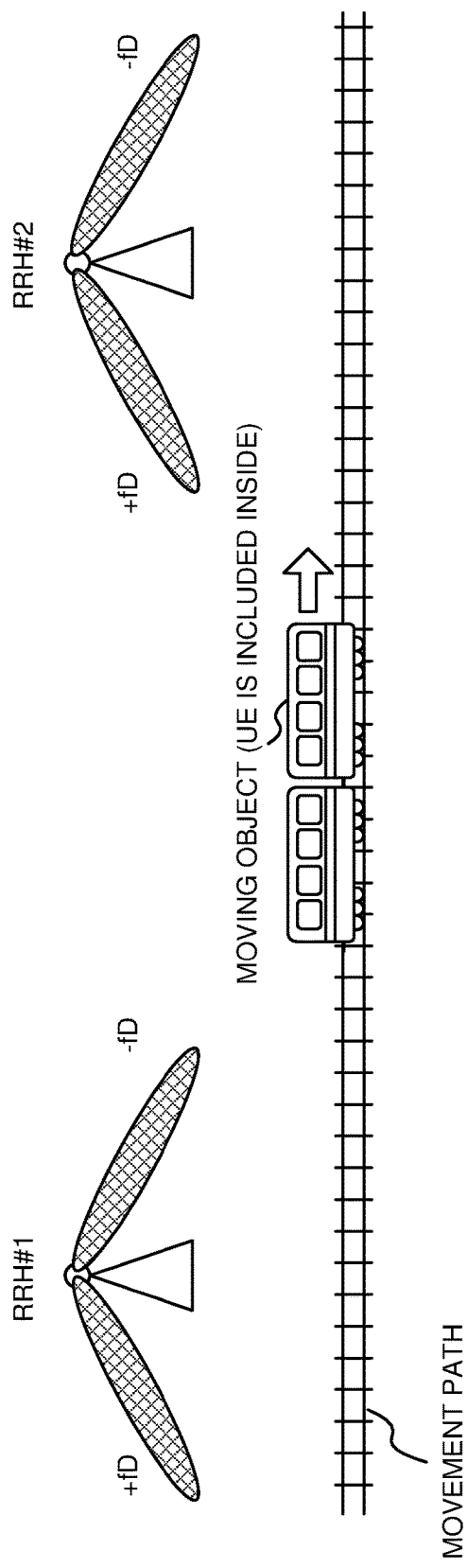

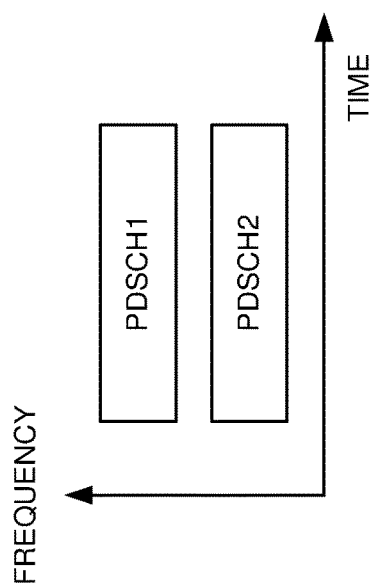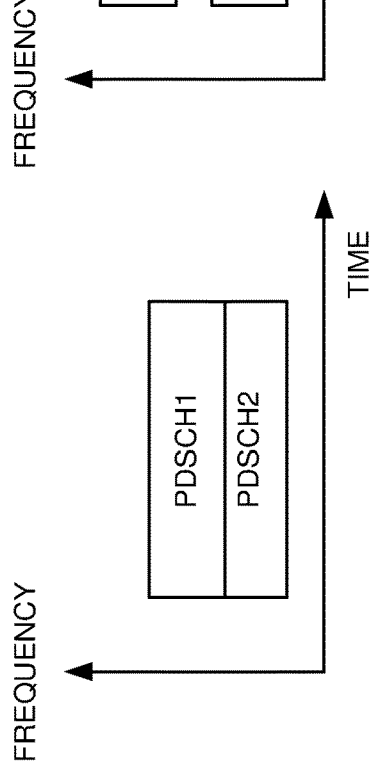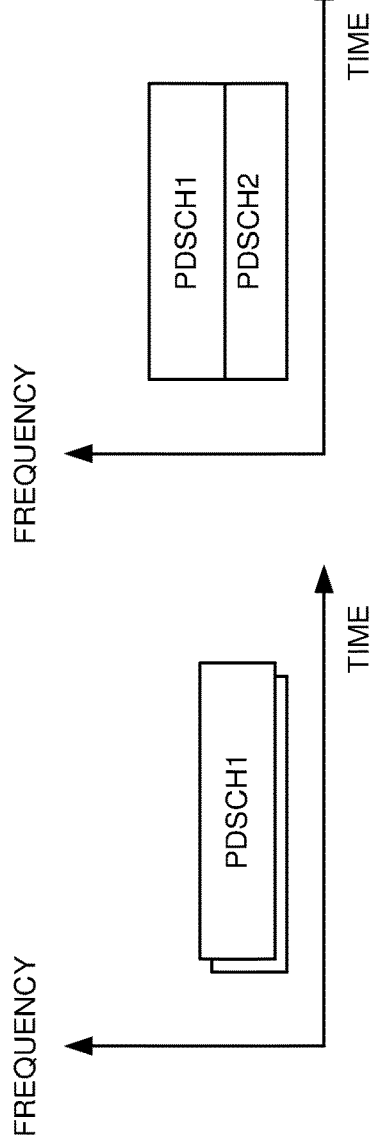

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In a radio communication system (for example, NR) in the future, it is assumed to, in order to achieve radio communication with a moving object (for example, a train or the like) moving at high speed, use beams transmitted from transmission points (for example, Remote Radio Heads (RRHs)) located on a path of the moving object.

However, sufficient discussion has not been made on how a terminal receives downlink data transmitted from a plurality of transmission points. Without identification of such operation, for example, throughput decrease potentially occurs.

Thus, it is an objective of the present disclosure to provide a terminal, a radio communication method, and a base station for appropriately receiving downlink data from a plurality of transmission points.

Solution to Problem

A terminal according to an aspect of the present disclosure includes: a receiving section that receives information indicating a plurality of transmission configuration indication (TCI) states for a same demodulation reference signal (DMRS) port for physical downlink shared channel (PDSCH); and a control section that determines, based on downlink control information, at least one of a TCI state and resource allocation of each of a plurality of PDSCHs that carry same downlink data.

Advantageous Effects of Invention

According to an aspect of the present disclosure, it is possible to appropriately receive downlink data from a plurality of transmission points.

BRIEF DESCRIPTION OF DRAWINGS

FIGS. 1A and 1B are diagrams to show examples of communication between a moving object and a transmission point (for example, RRH);

FIGS. 4A to 4C are diagrams to show examples of resource allocation of two PDSCHs;

DESCRIPTION OF EMBODIMENTS (HST)

Figure 2A:
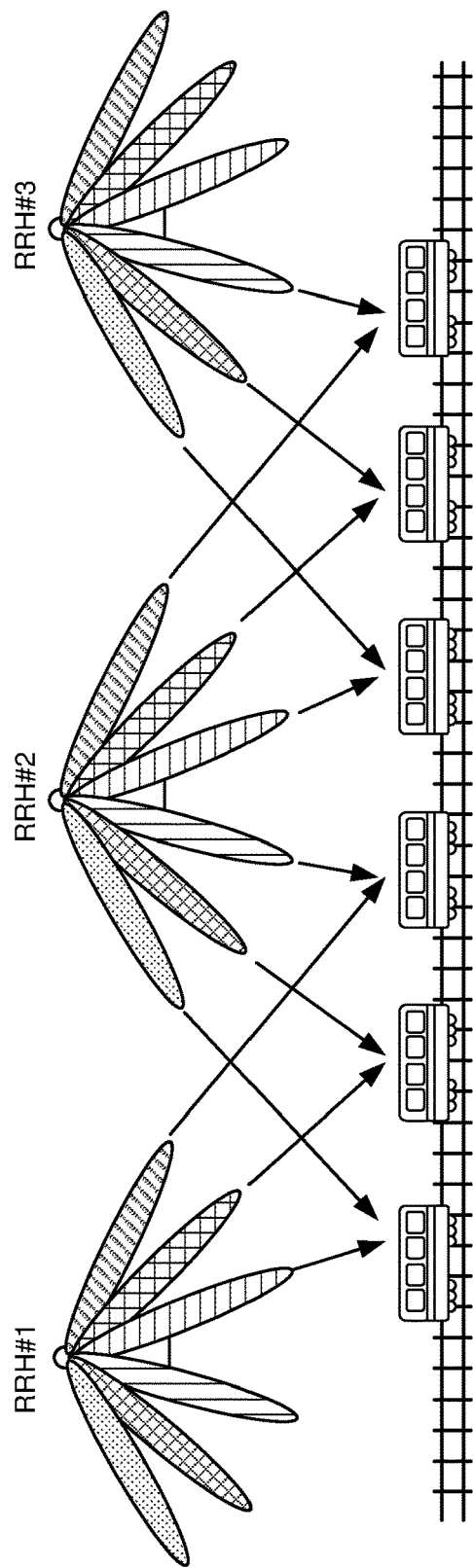
FIGS. 2A and 2B are diagrams to show examples of PDSCHs from a plurality of RRHs.

In NR, it is assumed that a beam transmitted from a transmission point (for example, RRH) is used to perform communication with a terminal (hereinafter also referred to as a UE) included in a moving object (HST (high speed train)) such as a train moving at high speed. In an existing system (for example, Rel. 15), it is supported to perform communication with a moving object by transmitting a beam in one direction from an RRH (refer to FIG. 1A).

FIG. 1A shows an example in which RRHs are installed along a movement path (moving direction, traveling direction, or travel path) of a moving object and a beam is formed on the traveling direction side of the moving object from each RRH. The RRH configured to form a beam in one direction may be referred to as a uni-directional RRH. In the example shown in FIG. 1A, the moving object is subjected to negative Doppler shift $(-f_D)$ from each RRH.

Note that, in this shown example, a beam is formed on the traveling direction side of the moving object, but the present invention is not limited thereto and a beam may be formed on the opposite direction side of the traveling direction or may be formed in any direction irrespective of the traveling direction of the moving object.

In Rel. 16 or later versions, it is also assumed that a plurality of (for example, two or more) beams are transmitted from an RRH. For example, it is assumed that beams are formed in both the traveling direction of the moving object and the opposite direction of the traveling direction (refer to FIG. 1B).

FIG. 1B shows an example in which RRHs are installed along the movement path of the moving object and beams are formed on both the traveling direction side and the opposite direction side of the traveling direction side of the moving object from each RRH. The RRH configured to form beams in a plurality of directions (for example, two directions) may be referred to as a bi-directional RRH.

In the example shown in FIG. 1B, a negatively Doppler-shifted signal is switched to a positively Doppler-shifted signal having higher electric power when the moving object is at the midpoint between two RRHs (in this example, RRH #1 and RRH #2). In this case, a maximum change width of Doppler shift needed to be corrected is a change from $-f_D$ to $+f_D$, which is twice as large as in the case of uni-directional RRHs.

In the future, it is desired to support communication with a moving object moving at speed of 500 km/h or higher by using a plurality of RRHs located on the movement path (without assist by macro cells).

However, it is assumed that it becomes difficult to appropriately perform control such as beam control and handover when a moving object moves at high speed.

For example, beam control in an existing system (for example, Rel. 15 or earlier versions) is performed through, for example, procedures of L1-RSRP report, beam notification (TCI state, spatial relation configuration, or activation), and receive beam determination. However, it is difficult to perform this series of processes (for example, TCI state notification or QCL assumption) in a short passing duration by using a method of the existing system.

Handover control is performed through, for example, procedures of measurement report (L3-RSRP, L3-SINR report), handover indication, random access channel transmission, and RRC connection completion, but it is difficult to perform this series of processes in a short passing duration.

(TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (expressed as a signal/channel) at a UE, based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread
QCL type B (QCL-B): Doppler shift and Doppler spread
QCL type C (QCL-C): Doppler shift and average delay
QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS)). The TCI state may be configured (indicated) by higher layer signaling or physical layer signaling, or a combination of these.

The physical layer signaling may be, for example, downlink control information (DCI).

A channel for which the TCI state or spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), and a tracking CSI-RS (also referred to as Tracking Reference Signal (TRS)), and a QCL detection reference signal (also referred to as QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

The RS of QCL type X of a TCI state may mean a RS in a QCL type X relation with a channel/signal (DMRS thereof) and may be referred to as a QCL source of QCL type X of the TCI state.

(Pathloss RS)

Pathloss $PL_{b,f,c}(q_d)$ [dB] in transmission power control of each of a PUSCH, a PUCCH, and an SRS is calculated by the UE by using an index $q_d$ of a downlink BWP reference signal (RS, Pathloss Reference RS) associated with an active UL BWP b of a carrier f of a serving cell c. In the present disclosure, pathloss reference RS, pathloss (PL)-RS, index $q_d$, RS used for pathloss calculation, and RS resource used for pathloss calculation may be interchangeably interpreted. In the present disclosure, calculation, estimation, measurement, and track may be interchangeably interpreted.

It has been discussed whether to change an existing mechanism of higher layer filtered RSRP for pathloss measurement when the pathloss RS is updated by a MAC CE.

When the pathloss RS is updated by a MAC CE, pathloss measurement based on L1-RSRP may be applied. At an available timing after the MAC CE for updating the pathloss RS, the higher layer filtered RSRP may be used for pathloss measurement and L1-RSRP may be used for pathloss measurement before the higher layer filtered RSRP is applied. At an available timing after the MAC CE for updating the pathloss RS, the higher layer filtered RSRP may be used for pathloss measurement, and the higher layer filtered RSRP of the previous pathloss RS may be used before the timing. Similarly to operation of Rel. 15, the higher layer filtered RSRP may be used for pathloss measurement, and the UE may track all pathloss RS candidates configured by RRC. The maximum number of pathloss RSs that can be configured by RRC may depend on UE capability. When X represents the maximum number of pathloss RSs that can be configured by RRC, pathloss RS candidates in a number equal to or lower than X may be configured by RRC and a pathloss RS may be selected from among the configured pathloss RS candidates by a MAC CE. The maximum number of pathloss RSs that can be configured by RRC may be, for example, 4, 8, 16, or 64.

In the present disclosure, the higher layer filtered RSRP, filtered RSRP, and layer 3 filtered RSRP may be interchangeably interpreted.

(Default TCI State/Default Spatial Relation/Default PL-RS)

In an RRC connection mode, when the time offset between reception of DL DCI (DCI to schedule PDSCH) and a corresponding PDSCH (PDSCH scheduled by the DCI) is smaller than a threshold value (timeDuration-ForQCL) (application condition, first condition) in both a case in which TCI information in DCI (higher layer parameter TCI-PresentInDCI) is set as "enabled" and a case in which no TCI information in DCI is set, the TCI state (default TCI state) of PDSCH may be the TCI state of the lowest CORESET ID in the latest slot in the active DL BWP of corresponding CC (of a specific UL signal) in a case of non-cross-carrier scheduling. Otherwise, the TCI state (default TCI state) of PDSCH may be the TCI state of the lowest TCI state ID of PDSCH in the active DL BWP of scheduled CC.

In Rel. 15, individual MAC CEs of a MAC CE for PUCCH spatial relation activation/deactivation and a MAC CE for SRS spatial relation activation/deactivation are needed. The PUSCH spatial relation depends on the SRS spatial relation.

In Rel. 16, at least one of the MAC CE for PUCCH spatial relation activation/deactivation and the MAC CE for SRS spatial relation activation/deactivation may be not used.

In FR2, when the spatial relation and the PL-RS for a PUCCH are both not configured (application condition, second condition), default assumption (default spatial relation and default PL-RS) of the spatial relation and the PL-RS is applied to the PUCCH. In FR2, when the spatial relation and the PL-RS for an SRS (SRS resource for the SRS or SRS resource corresponding to SRI in DCI format 0_1 for scheduling a PUSCH) are both not configured (application condition, second condition), default assumption (default spatial relation and default PL-RS) of the spatial relation and the PL-RS is applied to the PUSCH scheduled by DCI format 0_1 and the SRS.

When the CORESET is configured in the active DL BWP on the CC, the default spatial relation and the default PL-RS may be the TCI state or QCL assumption of the CORESET including the lowest CORESET ID in the active DL BWP. When the CORESET is not configured in the active DL BWP on the CC, the default spatial relation and the default PL-RS may be an active TCI state including the lowest ID of the PDSCH in the active DL BWP.

In Rel. 15, the spatial relation of a PUSCH scheduled by DCI format 0_0 depends on the spatial relation of a PUCCH resource having the lowest PUCCH resource ID among active spatial relations of the PUCCH on the same CC. A network needs to update the PUCCH spatial relation for all SCells even when no PUCCH is transmitted on the SCells.

In Rel. 16, no PUCCH configuration is needed for a PUSCH scheduled by DCI format 0_0. When there is no active PUCCH spatial relation nor PUCCH resource on an active UL BWP in the CC for a PUSCH scheduled by DCI format 0_0 (application condition, second condition), the default spatial relation and the default PL-RS are applied to the PUSCH.

The above-described threshold value may be referred to as, for example, a QCL time duration, "timeDurationForQCL", "Threshold", "Threshold for offset between a DCI indicating a TCI state and a PDSCH scheduled by the DCI", "Threshold-Sched-Offset", a schedule offset threshold value, or a scheduling offset threshold value.

(Multi TRPs)

In NR, it has been discussed that one or a plurality of transmission/reception points (TRPs) (multi TRPs (MTRP)) perform DL transmission to the UE by using one or a plurality of panels (multiple panels). It has been discussed that the UE performs UL transmission to one or a plurality of TRPs by using one or a plurality of panels.

Note that, a plurality of TRPs may correspond to the same cell identifier (ID) or may correspond to different cell IDs. Each cell ID may be a physical cell ID or a virtual cell ID.

The multi TRPs (for example, TRP #1 and TRP #2) may be connected through ideal/non-ideal backhaul to communicate information, data, and the like. Different code words (CW) and different layers may be transmitted from the respective TRPs of the multi TRPs. Non-coherent joint transmission (NCJT) may be used as a mode of multi TRP transmission.

In NCJT, for example, TRP #1 performs modulation mapping on a first code word and performs layer mapping to transmit a first PDSCH of a first number of layers (for example, two layers) by using first precoding. TRP #2 performs modulation mapping of a second code word and performs layer mapping to transmit a second PDSCH of a second number of layers (for example, two layers) by using second precoding.

Note that, a plurality of PDSCHs (multiple PDSCHs) subjected to NCJT may be defined to partially or completely overlap in at least one of time and frequency domains. Specifically, a first PDSCH from a first TRP and a second PDSCH from a second TRP may overlap in at least one of time and frequency resources.

It may be assumed that the first and second PDSCHs are not in a quasi-co-location (QCL) relation (not quasi-co-located). Reception of multiple PDSCHs may be interpreted as simultaneous reception of PDSCHs that are not of a certain QCL type (for example, QCL type D).

A plurality of PDSCHs (which may be referred to as multiple PDSCHs) from multi TRPs may be scheduled by using one DCI (single DCI, single PDCCH) (single master mode). A plurality of PDSCHs from multi TRPs may be scheduled by using a plurality of pieces of DCI (a plurality of DCI, multi DCI, multiple PDSCHs) (multi master mode).

With such a multi TRP scenario, it is possible to perform more flexible transmission control using a high-quality channel.

To support multi TRP transmission within a cell (intra-cell; having the same cell ID) and between cells (inter-cell; having different cell IDs) based on a plurality of PDSCHs, one control resource set (CORESET) in PDCCH configuration information (PDCCH-Config) may correspond to one TRP in RRC configuration information for linking a plurality of pairs of a PDCCH and a PDSCH including a plurality of TRPs.

(HST-SFN Scenario)

Discussions have been made on enhancement of support of an HST-single frequency network (SFN) location scenario as follows.

Operation of QCL assumption for a DMRS (for example, a plurality of QCL assumptions for the same DMRS port to achieve transmission only with DL).

QCL or Relation similar to QCL (including an applicable QCL type and an associated requirement) between DL and UL signals by reusing a unified TCI framework based on HST enhancement in Rel. 16.

Request times between two TRPs/RRHs/antennas (at a distance of 200 to 300 m) and between two beams (assumed to be 64 beams per TRP/RRH/antenna) are as follows.

With the distance of 200 m, the request time between two TRPs is 1.44 s and the request time between two beams is 22.5 ms.

With the distance of 300 m, the request time between two TRPs is 2.16 s and the request time between two beams is 33.75 ms.

With these calculated time scales, TCI state (beam) change based on DCI for PDSCH has a sufficient time for beam switching, and TCI state change based on MAC CE for PDCCH has a sufficient time as well.

An existing beam switching notification framework for PDCCH/PDSCH as described below can be basically reused.

Indication/update of TCI state for PDSCH based on RRC, MAC CE, and DCI.

Indication/update of TCI state for PDCCH/PDSCH based on RRC and MAC CE.

In Rel. 16, a new DMRS table (new antenna port indication table) for multiple PDSCHs (multi TRPs) transmission based on single DCI is defined for an antenna port field of DCI format 1_1.

When two TCI states in a code point of the DCI field "Transmission Configuration Indication" and a DM-RS port in two code division multiplexing (CDM) groups in the DCI field "antenna port" are indicated, the first TCI state corresponds to a CDM group of a first antenna port indicated by the antenna port indication table, and the second TCI state corresponds to another CDM group.

In multiple PDSCH transmission based on single DCI, the TCI field in the DCI can indicate one or two TCI states for PDSCH DMRS. When two TCI states are indicated, the two TCI states correspond to different CDM groups of DMRS.

A new MAC CE in NR Rel. 16 supports activation of one or two TCI states for each code point in the TCI field of DCI.

It has been discussed that, for HST performance improvement, multi TRPs/RRHs (using different QCL/beams) simultaneously transmit multiple PDSCHs (identical code word (CW)/transport block (TB)) to one UE.

Figure 2B:
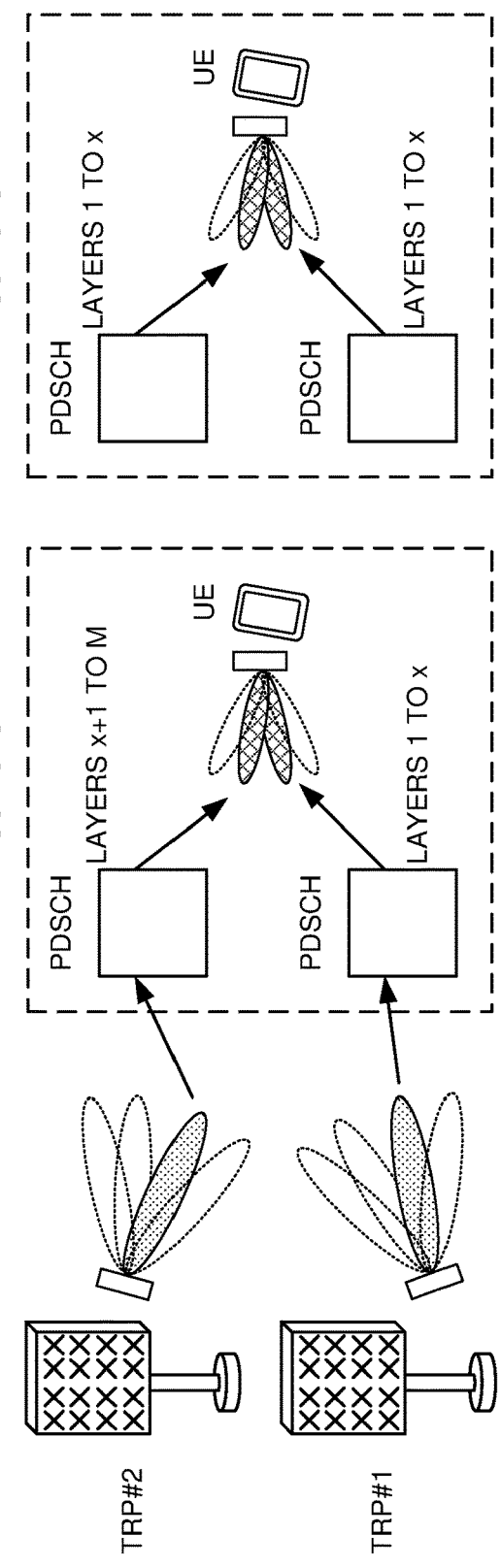

It is conceivable that, as shown in FIG. 2A, a moving object (UE) receives beams (PDSCHs) from two RRHs (TRPs). PDSCH case 1 in the example of FIG. 2B is supported in NR Rel. 16 using multiple PDSCH NCJT transmissions based on single DCI and multi DCI. Two pieces of DL data (CWs/TBs), two DL data, may be transmitted in the multiple PDSCH transmission based on multi DCI. One or two pieces of DL data (CWs/TBs) may be transmitted in the multiple PDSCH transmission based on single DCI. PDSCHs from different TRPs may be transmitted by using different layers. For example, a PDSCH from TRP #1 may be transmitted by using layers 1 to x, and a PDSCH from TRP #2 may be transmitted by using layers x+1 to M (layers different from those for TRP #1).

PDSCH case 2 in the example of FIG. 2B is not supported in NR Rel. 16 but is effective for the HST-SFN scenario. The same DL data (identical data/CW/TB/PDSCH) may be transmitted from multi TRPs for reliability improvement. PDSCHs from different TRPs may be transmitted by using the same layer. For example, a PDSCH from TRP #1 and a PDSCH from TRP #2 may be both transmitted by using layers 1 to x (same layers).

However, operation for supporting PDSCH case 2 is not identified. For example, a QCL assumption (DMRS assumption) in PDSCH case 2 is not identified. Without identification of such operation, for example, throughput decrease potentially occurs.

Thus, the inventors of the present invention came up with the idea of operation when same downlink data is transmitted from a plurality of transmission points.

Embodiments according to the present disclosure will be described in detail with reference to the drawings as follows. Configurations in the embodiments may each be employed individually, or may be employed in combination.

In the present disclosure, a panel, an Uplink (UL) transmission entity, a transmission point, a transmission/reception point (TRP), an RRH, an antenna, a beam, a QCL assumption, a TCI state, a spatial relation, a control resource set (CORESET), a PDSCH, a code word, a base station, an antenna port for a certain signal (for example, demodulation reference signal (DMRS) port), an antenna port group for a certain signal (for example, a DMRS port group), a group for multiplexing (for example, a code division multiplexing (CDM) group, a reference signal group, or a CORESET group), a CORESET pool, a CW, a redundancy version (RV), and a layer (a MIMO layer, a transmission layer, or a spatial layer) may be interchangeably interpreted. A panel Identifier (ID) and a panel may be interchangeably interpreted. In the present disclosure, a TRP ID and a TRP may be interchangeably interpreted.

In the present disclosure, a beam, a TCI state, a QCL assumption, a QCL parameter, a spatial domain reception filter, a UE spatial domain reception filter, a UE receive beam, a DL receive beam, a DL precoding, a DL precoder, a DL-RS, a RS of QCL type D of a TCI state or a QCL assumption, and a RS of QCL type A of a TCI state or a QCL assumption may be interchangeably interpreted. In the present disclosure, a QCL type X-RS, a DL-RS associated with QCL type X, a DL-RS having a QCL type X, a DL-RS source, an SSB, and a CSI-RS may be interchangeably interpreted.

In the present disclosure, a TCI state may be information (for example, a DL-RS, a QCL type, or a cell with which a DL-RS is transmitted) related to a receive beam (spatial domain reception filter) indicated (configured) for a UE. A QCL assumption may be information (for example, a DL-RS, a QCL type, or a cell with which a DL-RS is transmitted) related to a receive beam (spatial domain reception filter) assumed by a UE, based on transmission or reception of an associated signal (for example, a PRACH).

In the present disclosure, a moving object may be any object that moves at a speed equal to or higher than a certain speed and may be, for example, a train, a vehicle, a bike, or a ship. Communication between a UE included in the moving object and a transmission point (for example, an RRH) may be directly performed between the UE and the transmission point or may be performed between the UE and the transmission point through the moving object (for example, an antenna installed on the moving object).

In the present disclosure, a UE included in a moving object (HST) may be simply referred to as a UE.

In the present disclosure, "A/B" may be interpreted as at least one of A and B, and "A/B/C" may be interpreted as at least one of A, B, and C. In the present disclosure, a cell, a CC, a carrier, a BWP, an active DL BWP, an active UL BWP, and a band may be interchangeably interpreted. In the present disclosure, an RRC parameter, a higher layer parameter, an RRC information element (IE), and an RRC message may be interchangeably interpreted. In the present disclosure, for example, an index, an ID, an indicator, and a resource ID may be interchangeably interpreted.

In the present disclosure, to support, to control, to be able to control, to operate, and to be able to operate may be interchangeably interpreted.

In the present disclosure, to activate, to update, to indicate, to enable, and to specify may be interchangeably interpreted.

In the present disclosure, downlink (DL) data, a CW, a TB, and a PDSCH may be interchangeably interpreted.

(Radio Communication Method)

Although in each embodiment below, description is made on a case in which same DL data is transmitted from two transmission points (TRPs, RRHs), the number of transmission points is not limited to two but may be equal to or larger than three.

In each embodiment, a plurality of PDSCHs may be transmitted from one or more transmission points (TRPs, RRHs) located on the movement path.

First Embodiment

A UE may support configuration/indication of QCL/TCI states in a number up to X (X is equal to one or multiple, and for example, X=2) for a same DMRS port for PDSCH reception (for each layer) at one UE.

A new PDSCH transmission mode using one or a plurality of TCI states for the same PDSCH DMRS port may be defined. In the present disclosure, the new PDSCH transmission mode, configuration/indication of one or more TCI states for the same PDSCH DMRS port, and configuration/indication of a plurality of TCI states for the same PDSCH DMRS port may be interchangeably interpreted. The new PDSCH transmission mode may be configured/indicated with at least one of Options 1 to 3 below.

[Option 1]

The new PDSCH transmission mode is configured by RRC.

[Option 2]

The new PDSCH transmission mode is indicated by a MAC CE. For example, the new PDSCH transmission mode may be indicated together with TCI state activation/deactivation for UE-specific PDSCH. When a reserved ('R') bit (R=1) in "enhanced TCI state activation/deactivation MAC CE for UE-specific PDSCH" in Rel. 16 is reused and two TCI states are activated for one TCI code point in DCI, this may mean that the UE assumes two TCI states for all DMRS ports for PDSCH reception.

This MAC CE may include the reserved bit R, a serving cell ID, a BWP ID, $C_i$ indicating existence of a TCI state $ID_{i,2}$, and a TCI state $ID_{i,j}$. $C_i$ is set to "1" when the TCI state $_{i,2}$ exists, or $C_i$ is set to "0" otherwise. The TCI state indicates a TCI state ID identified by a higher layer parameter (TCI-StateId). i is an index of a code point in the TCI field of DCI. The TCI state is the j-th TCI state indicated by the i-th code point in the TCI field.

Figure 3:
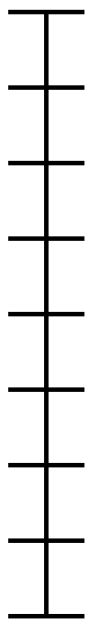
FIG. 3 is a diagram to show an example of an enhanced TCI state activation/deactivation MAC CE for UE-specific PDSCH.

In a case of R=1 in an example shown in FIG. 3, the TCI state corresponding to each code point in the TCI field in DCI is applied to all DMRS ports for PDSCH. In a case of R=0, for operation of Rel. 16 and indicated two TCI states corresponding to one code point in the TCI field in DCI, the two TCI states are applied to different CDM groups of PDSCH DMRS.

[Option 3]

The new PDSCH transmission mode is indicated by DCI. For the new PDSCH transmission mode, a new one bit in DCI may be explicitly indicated. The new PDSCH transmission mode may be implicitly indicated. For example, an additional DAI field including an RRC configuration ACKNACKFeedbackMode=JointFeedback is reused for the mode. Configuration of ACKNACKFeedbackMode is not a matter for this mode. The mode affects the number of bits of a downlink assignment indicator (DAI).

Semi-static change among the new PDSCH transmission mode, a multiple PDSCH transmission mode based on single DCI of Rel. 16, and a multiple PDSCH transmission mode based on multi DCI of Rel. 16 may be achieved with Option 1 and/or Option 2.

Dynamic change between the new PDSCH transmission mode and the multiple PDSCH transmission mode based on single DCI of Rel. 16 may be achieved with Option 3.

The relation X>2 may be satisfied.

According to the first embodiment described above, one or a plurality of TCI states can be appropriately configured/indicated for the same DMRS port.

Second Embodiment

An antenna port indication table for PDSCH DMRS (antenna port table, DMRS table) may be used for a new PDSCH transmission mode.

The antenna port indication table may be configured in accordance with any of Options 1 and 2 below.

[Option 1]

An antenna port indication table for the new PDSCH transmission mode may be defined/fixed in specifications.

The antenna port indication table for the new PDSCH transmission mode may follow any of Options 1-1 to 1-3 below.

[[Option 1-1]]

The antenna port indication table for the new PDSCH transmission mode may be an antenna port indication table (Table 7.3.1.2.2-1/2/3/4) of Rel. 15.

<<Example of Option 1-1>>

The UE uses Table 7.3.1.2.2-1/2/3/4 when the UE is configured/indicated with the new PDSCH transmission mode. Otherwise, the UE uses Table 7.3.1.2.2-1A/2A/3A/4A when the UE receives an activation command (MAC CE) that maps at least one code point in the DCI field of TCI to two TCI states.

[[Option 1-2]]

The antenna port indication table for the new PDSCH transmission mode may be an antenna port indication table (Table 7.3.1.2.2-1A/2A/3A/4A) of Rel. 16.

<<Example of Option 1-2>>

The UE uses Table 7.3.1.2.2-1A/2A/3A/4A when the UE is configured/indicated with the new PDSCH transmission mode or when the UE receives an activation command (MAC CE) that maps at least one code point in the DCI field of TCI to two TCI states. Otherwise, the UE uses Table 7.3.1.2.2-1/2/3/4.

[[Option 1-3]]

The UE may use an antenna port indication table of Rel. 15 when all (individual) code points in the DCI field of TCI at a MAC CE are mapped to one TCI state. The UE may use an antenna port indication table of Rel. 16 when at least one code point in the DCI field of TCI at a MAC CE is mapped to two TCI states.

<<Example of Option 1-3>>

The UE uses Table 7.3.1.2.2-1A/2A/3A/4A when the UE receives an activation command (MAC CE) that maps at least one code point in the DCI field of TCI to two TCI states. Otherwise, the UE uses Table 7.3.1.2.2-1/2/3/4.

[Option 2]

The UE may be configured with the antenna port indication table for the new PDSCH transmission mode.

The antenna port indication table for the new PDSCH transmission mode may follow any of Options 2-1 and 2-2 below.

[[Option 2-1]]

The UE may be configured with any of an antenna port indication table of Rel. 15 and an antenna port indication table of Rel. 16.

[[Option 2-2]]

The UE may be configured with only one of an antenna port indication table of Rel. 15 and an antenna port indication table of Rel. 16 when at least one code point in the DCI field of TCI at a MAC CE is mapped to two TCI states. The UE may use an antenna port indication table of Rel. 15 when all (individual) code points in the DCI field of TCI at a MAC CE are mapped to one TCI state. In this case, the UE may not be configured with the antenna port indication table for the new PDSCH transmission mode.

According to the second embodiment described above, the UE can use an appropriate antenna port indication table for the new PDSCH transmission mode.

Third Embodiment

UE operation of PDSCH DMRS reception may be defined in a new PDSCH transmission mode.

When a UE is configured/indicated with the new PDSCH transmission mode (one or more TCI states for the same PDSCH DMRS port) and two TCI states are indicated for one code point in the DCI field of TCI, the two TCI states may correspond to all DMRS ports indicated by an antenna port indication table.

When the UE is configured/indicated with the new PDSCH transmission mode (one or more TCI states for the same PDSCH DMRS port), one or two TCI states indicated for one code point in the DCI field of TCI may correspond to all DMRS ports indicated by an antenna port indication table.

According to the third embodiment described above, the UE can appropriately receive a PDSCH DMRS.

Fourth Embodiment

PDSCH default QCL may be defined when DCI does not include a TCI field or when a scheduling offset is smaller than a threshold value (QCL duration, timeDuration-ForQCL).

The PDSCH default QCL may be same as that in NR Rel. 16 when an existing single DCI-based framework is reused for scheduling of the new PDSCH transmission mode.

The UE may be configured/indicated with a new PDCCH transmission mode for HST-SFN PDCCH QCL enhancement. The new PDCCH transmission mode may be configuration/activation/indication of one or a plurality of TCI states for one CORESET. The one or a plurality of TCI states for a CORESET may be configured/activated/indicated with at least one of an RRC and a MAC CE. The plurality of TCI states may be two TCI states.

When the new PDCCH transmission mode is configured/indicated and two TCI states are configured/indicated for at least one CORESET, the UE may follow at least one of Procedures 1 and 2 below.

[Procedure 1]

When TCI in DCI presence information (tci-PresectIn-DCI) is set to "enabled", an offset (time offset) between DL DCI (DCI to schedule a PDSCH) and the corresponding PDSCH is smaller than the threshold value (timeDuration-ForQCL), and at least one TCI state configured for a serving cell of the scheduled PDSCH includes "QCL type D", the UE may be follow any of Procedures 1-1 and 1-2 below.

[[Procedure 1-1]] (Similar to Rel. 16)

When at least one TCI code point indicates two TCI states, the UE may assume that the PDSCH DMRS port of the serving cell is quasi co-located with a RS related to a QCL parameter associated with a TCI state corresponding to the lowest code point among TCI code points including two different TCI states.

[[Procedure 1-2]] (New Rule (for Example, Rel. 17))

When two TCI states are indicated for at least one CORESET, the UE may assume that the PDSCH DMRS port of the serving cell is quasi co-located with a RS related to a QCL parameter associated with a TCI state corresponding to the lowest CORESET ID among CORESETs for which two different TCI states are indicated.

[Procedure 2]

When a PDSCH is scheduled by a DCI format including no TCI field, the UE may follow any of Procedures 2-1 to 2-3 below.

[[Procedure 2-1]] (New Rule (for Example, Rel. 17))

The UE may assume that a TCI state (one or two TCI states) or QCL assumption for PDSCH is identical to any TCI state or QCL assumption applied to a CORESET used for PDCCH transmission. One or two TCI states are indicated for the CORESET.

[[Procedure 2-2]] (New Rule (for Example, Rel. 17))

The UE may assume that two TCI states or QCL transmission for PDSCH are identical to two TCI states or QCL transmission corresponding to the lowest CORESET ID among CORESETs for which two different TCI states are indicated.

[[Procedure 2-3]] (New Rule (for Example, Rel. 17))

The UE may assume Procedure 2-1 when an offset (time offset) between DL DCI and a PDSCH corresponding to the DL DCI is equal to or larger than the threshold value (timeDurationForQCL). The UE may assume Procedure 2-2 when the offset (time offset) between DL DCI and a PDSCH corresponding to the DL DCI is smaller than the threshold value.

Configuration/indication for the new PDCCH transmission mode and configuration/indication for the new PDSCH transmission mode may be separated configurations/indications or may be common configurations/indications.

At least one of UE capabilities 1 and 2 below may be defined.

[UE Capability 1]

Whether the UE supports a plurality of (for example, two) TCI states for the same DMRS port for PDSCH (for each layer).

[UE Capability 2]

The maximum number of TCI states for the same DMRS port for PDSCH (for each layer). The maximum number may be reported when the maximum number is larger than two.

Information related to beam transition may be used when the new PDSCH transmission mode is configured/indicated. This may mean that the ordering or pattern of QCL transition is configured/indicated for the new PDSCH transmission mode.

The UE may control reception of DL transmission transmitted from a TRP (transmission point) based on the information related to beam transition. The beam transition may be interchangeably interpreted with TCI state transition or QCL transition. The information related to beam transition may be notified from a network (for example, a base station or a transmission point) to the UE by using at least one of RRC signaling and a MAC CE or may be defined in specifications in advance.

The information related to beam transition may include at least one of information related to TCI state transition, a duration corresponding to each beam (also referred to as a beam duration or a beam time), and a duration corresponding to an RRH (also referred to as an RRH duration or an RRH time). Note that, a duration or a time may be defined in the unit of at least one of a symbol, a slot, a subslot, a subframe, and a frame or may be defined in the unit of ms or μm. A duration or a time may be interpreted with a distance or an angle.

The information related to TCI state transition (for example, TCI #n→TCI #n+1) may be TCI state transition/ordering/index. The duration corresponding to a beam may be the duration/dwell-time of the beam. The duration corresponding to a transmission point (RRH) may be the duration/dwell-time of the RRH.

In each ordering or pattern, one or two TCI states may be configured and correspond to all DMRS ports for PDSCH reception.

According to the time scale analysis described above, beam indication based on PDSCH DCI can be operated, and thus the ordering or pattern of QCL transition may be unnecessary for PDSCH.

According to the fourth embodiment described above, the UE can appropriately determine a parameter related to PDSCH QCL.

Fifth Embodiment

When a new PDSCH transmission mode is configured/indicated, resource allocation of the same DL data from multi TRPs may be configured in accordance with any of Resource Allocations 1 to 3 below.

[Resource Allocation 1]

Time/frequency resource allocation completely overlaps. In an example of FIG. 4A, time and frequency resources completely overlap for PDSCH1 and PDSCH2 scheduled by one piece of DCI.

When QCL type D is configured/indicated in at least one TCI state for PDSCH reception, the case of complete overlapping may be supported.

[Resource Allocation 2]

Time/frequency resource allocation partially overlaps. In an example of FIG. 4B, time/frequency resources partially overlap in PDSCH1 and PDSCH2 scheduled by one piece of DCI.

When QCL type D is configured/indicated in at least one TCI state for PDSCH reception, the case of partial overlapping may be supported.

[Resource Allocation 3]

Time/frequency resource allocation does not overlap. In an example of FIG. 4C, time/frequency resources do not overlap in PDSCH1 and PDSCH2 scheduled by one piece of DCI.

In Resource Allocations 1 and 2, when spatial isolation is sufficient for beams from two TRPs, interference between the TRPs is small. When QCL type D is indicated in at least one TCI state for PDSCH reception, Resource Allocations 1 and 2 may be supported.

In scheduling based on single DCI, a plurality of resource assignment (RA, TDRA/FDRA)/rate matching (RM, rate matching indicator (RMI))/QCL (TCI state) indications that are indicated by the single DCI may be enhanced for DCI with respect to Resource allocations 2 and 3. The RA/RM/QCL for PDSCHs from multi TRPs may be separately indicated or may be jointly indicated.

All Resource Allocations 1 to 3 may be supported for the new PDSCH transmission mode. At least one of Resource Allocations 1 to 3 may be supported.

The UE can obtain a composite gain for same DL data from multi TRPs.

PDSCH transmission from multi TRPs may be scheduled by single DCI in accordance with any of Scheduling Methods 1 and 4 below.

[Scheduling Method 1]

The UE is configured with higher layer parameters for one TRP and applies a common value (value for one TRP) indicated by the DCI field to multi TRPs.

[Scheduling Method 2]

The UE is configured with higher layer parameters for multi TRPs and applies a common value (value for one TRP) indicated by the DCI field to the multi TRPs.

[Scheduling Method 3]

The UE is configured with higher layer parameters for multi TRPs and applies a value (a value of the number of scheduled TRPs, a value for each TRP) indicated by an enhanced DCI field to each TRP.

Figure 5:
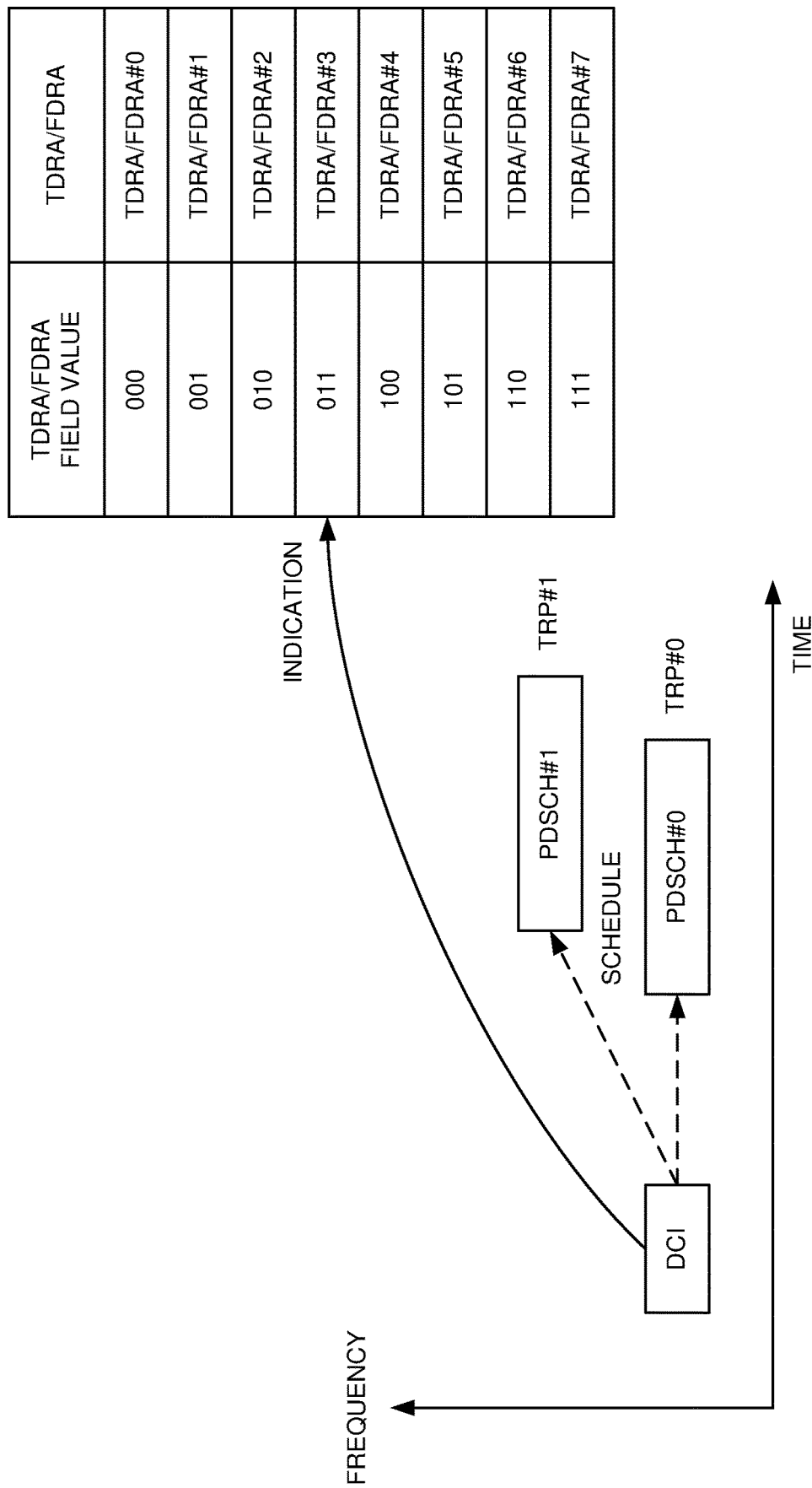
FIG. 5 is a diagram to show an example of a TDRA/FDRA determination method.

In an example shown in FIG. 5, the UE is configured with a list of a plurality of configurations of TDRA/FDRA. Each configuration in the list is associated with a field value (code point) of TDRA/FDRA in DCI. The DCI includes a field of TDRA/FDRA for PDSCH0 from TRP #0 and a field of TDRA/FDRA for PDSCH1 from TRP #1. Each field of TDRA/FDRA indicates one configuration in the list.

For example, when the DCI field per TRP is three bits, the DCI field for two TRPs is six bits. Accordingly, scheduling for each TRP is flexible. To determine the number of bits before DCI blind detection, the number of scheduled TRPs may be configured by a higher layer parameter or may be defined in specifications.

The DCI field size may be larger than the DCI field size for one TRP by a factor of times in the number of TRPs. The DCI field size per TRP may be equal to an existing DCI field size (for example, three bits) or may be smaller than the existing DCI field size (for example, two bits).

The DCI field size for a particular TRP may be equal to the existing DCI field size (for example, three bits), and the DCI field size for other TRPs may be smaller than the existing DCI field size (for example, two bits).

[Scheduling Method 4]

The UE is configured with higher layer parameters for one TRP and derives, from a value for one TRP indicated by the DCI field, a value for another TRP. For example, the UE derives the value for another TRP by adding an offset to the value for one TRP indicated by the DCI field.

Figure 6:
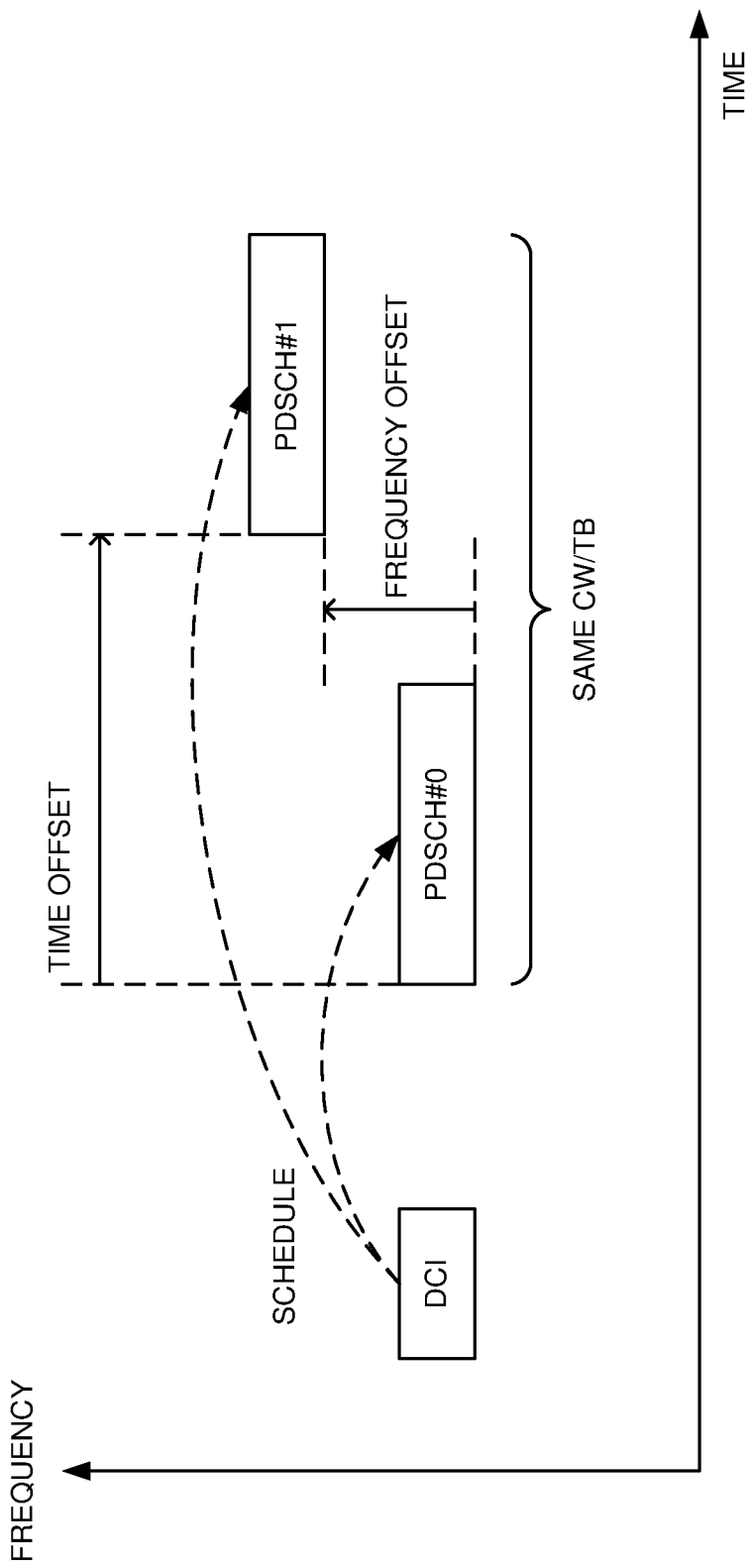
FIG. 6 is a diagram to show an example of Scheduling Method 4.

The offset may be a time directional offset for TDRA or may be a frequency directional offset for FDRA. In an example shown in FIG. 6, the offset may be at least one of a time offset from the time (for example, start or end slot/symbol/) of PDSCH #0 to the time (for example, start or end) of PDSCH #1 and a frequency offset from the frequency (for example, lowest PRB) of PDSCH #0 to the frequency (for example, lowest or highest PRB/subcarrier) of PDSCH #1.

The offset may be defined in specifications, may be configured by a higher layer parameter, or may be reported as UE capability.

A plurality of offsets may be defined/configured/reported. The UE may use one of the plurality of offsets (may switch one of the plurality of offsets) based on at least one of the number of PDSCHs supported by the UE, the number of TRPs supported by the UE, the number of configured beams, and the moving speed of the UE.

The DCI field in Scheduling Methods 1 and 4 may be at least one of TCI state, TDRA, and FDRA.

Comparison is made between a case (Resource Allocations 1 and 2) in which the PRBs of two PDSCHs from two TRPs overlap and a case (Resource Allocation 3) in which the PRBs do not overlap.

When the PRBs completely overlap (Resource Allocation 1), the time/frequency resources of the two PDSCHs are same, and thus TDRA/FDRA enhancement and DCI field enhancement for time/frequency indication are unnecessary in single DCI (similarly to single DCI for enhanced Mobile Broad Band (eMBB) in Rel. 16).

When the PRBs do not overlap (Resource Allocation 3), the time/frequency resources of the two PDSCHs are different from each other, and thus TDRA/FDRA enhancement and DCI field enhancement for time/frequency indication are needed in single DCI.

The UE that supports the new PDSCH transmission mode may assume that the PRBs of two PDSCHs from two TRPs do not overlap.

The expectation value of received power when the PRBs of two PDSCHs from two TRPs do not overlap may be set to be twice as large as the expectation value of received power of a single TRP.

When the PRBs overlap, the UE receives a complex reception signal $y=h1s1+h2s1=(h1+h2)s1$. The UE can obtain h1 and h2 by channel estimation of each PDSCH. The DMRSs are orthogonal to each other (for example, included in different CDM groups). The UE obtains $y(h1+h2)^*=(h1+h2)(h1+h2)^*=|h1+h2|^2 s1$ by multiplying the reception signal by $(h1+h2)^*$. The notation $h^*$ means the complex conjugate of h. The expectation value (ensemble average) of received power is $|s1|^2$.

When the PRBs do not overlap, the UE receives complex reception signals $y1=h1s1$ and $y2=h2s1$ on each PDSCH resource. The UE can obtain h1 and h2 by channel estimation of each PDSCH. The DMRSs are orthogonal to each other (for example, included in different CDM groups). For the first PDSCH, the UE obtains $y1h1=h1h1^* s1=|h1|^2 s1$ by multiplying the reception signal y1 and $h1^*$. For the second PDSCH, the UE obtains $y2h2=h2h2^* s1=|h2|^2 s1$ by multiplying the reception signal y2 and $h2^*$. The UE obtains $|h1|^2 s1+|h2|^2 s1$ by coherently synthesizing the two reception signals. The expectation value (ensemble average) of received power is $2|s1|^2$.

In a case in which the PRBs do not overlap, a doubled electric power gain is obtained for a single TRP. In a case in which the PRBs overlap, no electric power gain is obtained for a single TRP. Thus, the case in which the PRBs do not overlap is preferably a main use case. This use case may be an HST use case or a case in which resource use efficiency is not so much important.

Spatial isolation is thought to be sufficient for two beams when the UE includes multiple panels and can use different panels for reception of different analog beams from different TRPs (when the UE includes multiple panels in frequency range (FR) 2 and path correlation is small among the multiple panels). In this case, it is conceivable that the UE can distinguish channels (h1 and h2) from the two beams even on the same time/frequency resources for decoding. In this case, the UE can obtain $h1s1$ from Panel 1 and $h2s2$ from Panel 2 (instead of obtaining only $h=h1+h2$). Performance equivalent to that in the case in which the PRBs do not overlap can be acquired.

Thus, in the fifth embodiment, restrictions when QCL type D is indicated in at least one TCI state for PDSCH reception may added. A gain equivalent to that in the case in which the PRBs do not overlap can be acquired in the case in which the PRBs overlap by using analog beam forming reception of different panels (QCL type D).

According to the fifth embodiment described above, the UE can appropriately acquire information related to scheduling of PDSCHs from multi TRPs.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 7:
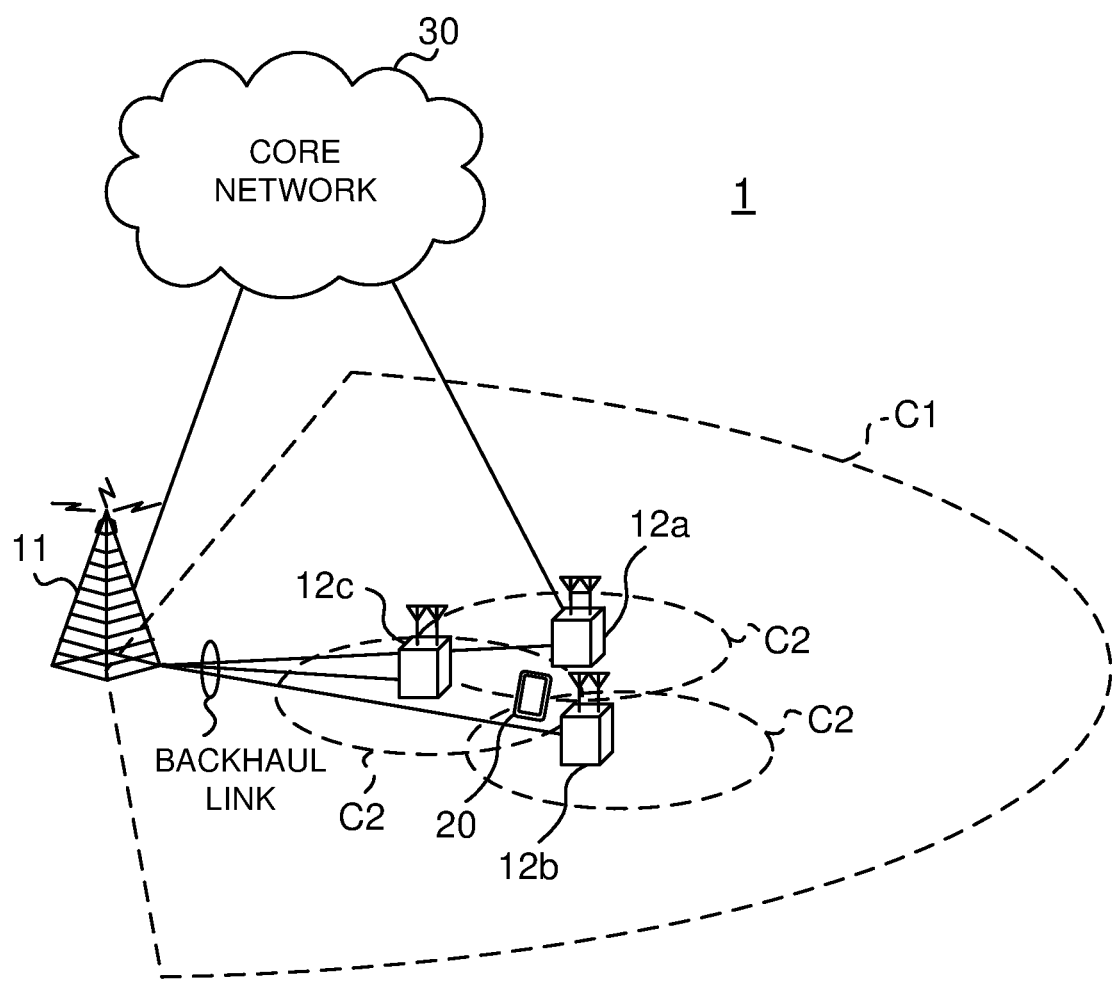
FIG. 7 is a diagram to show an example of a schematic structure of a radio communication system according to one embodiment.

FIG. 7 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations (for example, RRHs) 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 8:
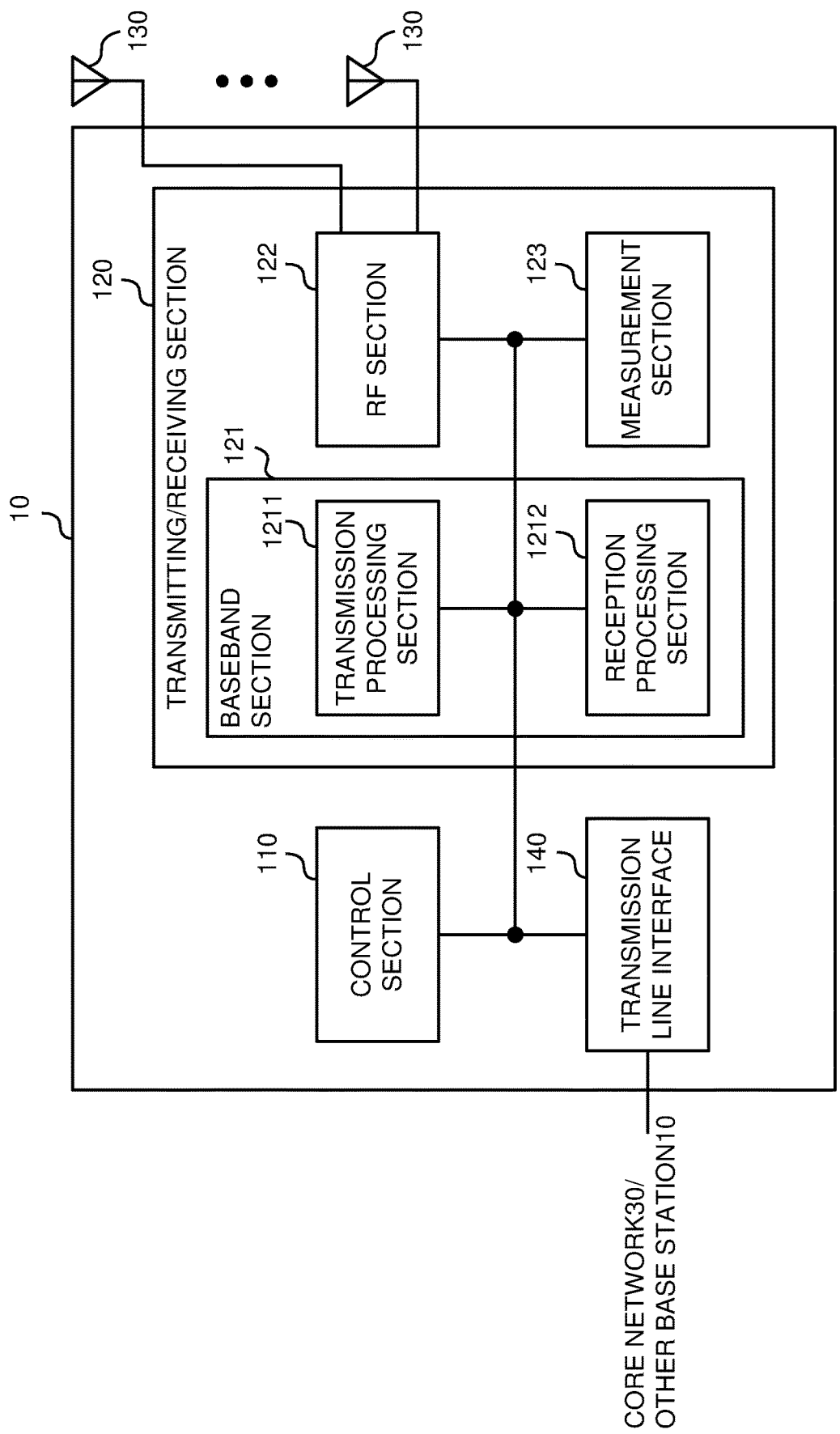
FIG. 8 is a diagram to show an example of a structure of a base station according to one embodiment.

FIG. 8 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit information indicating a plurality of transmission configuration indication (TCI) states for a same demodulation reference signal (DMRS) port for physical downlink shared channel (PDSCH) reception. The control section 110 may control transmission of a plurality of PDSCHs that carry same downlink data by using the plurality of TCI states.

The transmitting/receiving section 120 may transmit information indicating a plurality of transmission configuration indication (TCI) states for a same demodulation reference signal (DMRS) port for physical downlink shared channel (PDSCH). The control section 110 may control transmission of downlink control information indicating at least one of a TCI state and resource allocation of each of a plurality of PDSCHs that carry same downlink data.

(User Terminal)

Figure 9:
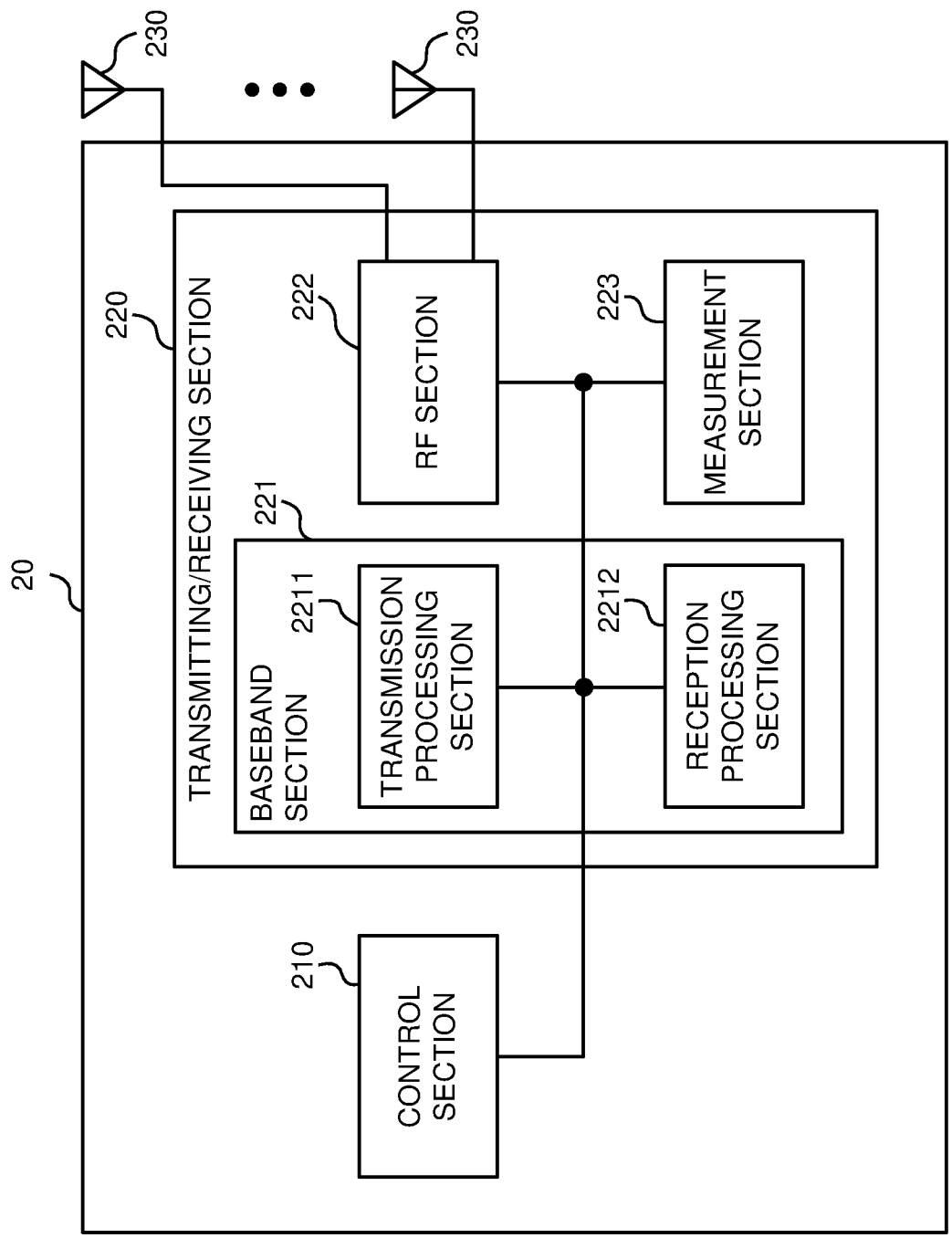
FIG. 9 is a diagram to show an example of a structure of a user terminal according to one embodiment.

FIG. 9 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive information (for example, configuration/indication, RRC parameter/MAC CE/DCI) indicating a plurality of transmission configuration indication (TCI) states for a same demodulation reference signal (DMRS) port for physical downlink shared channel (PDSCH) reception. The control section 210 may use the plurality of TCI states for reception of a plurality of PDSCHs that carry same downlink data (the first embodiment).

The control section 210 may determine the DMRS port for the PDSCHs, based on association (for example, an antenna port indication table) of a DMRS port number with a value of an antenna port field in the downlink control information (the second embodiment).

One or two TCI states indicated at one code point of a TCI field in the downlink control information may correspond to all DMRS ports indicated by the association (the third embodiment).

The plurality of PDSCHs may be transmitted from one or more transmission points located on the movement path.

The transmitting/receiving section 220 may receive information (for example, configuration/indication, RRC parameter/MAC CE/DCI) indicating a plurality of transmission configuration indication (TCI) states for a same demodulation reference signal (DMRS) port for physical downlink shared channel (PDSCH). The control section 210 may determine, based on downlink control information, at least one of a TCI state and resource allocation of each of a plurality of PDSCHs that carry same downlink data (the fourth embodiment, the fifth embodiment).

When the downlink control information includes no TCI field or when a time offset between the downlink control information and the plurality of PDSCHs is smaller than a threshold value, the control section 210 may use default value for the TCI state (the fourth embodiment).

The transmitting/receiving section 220 may receive configuration of PDSCH for one or a plurality of transmission points. The control section 210 may determine at least one of the TCI state and the resource allocation, based on the configuration and the downlink control information (the fifth embodiment).

The plurality of PDSCHs may be transmitted from one or more transmission points located on the movement path.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (separate apparatus), for example, via wire, wireless, or the like and using these plurality of pieces of apparatus (these apparatus). The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 10:
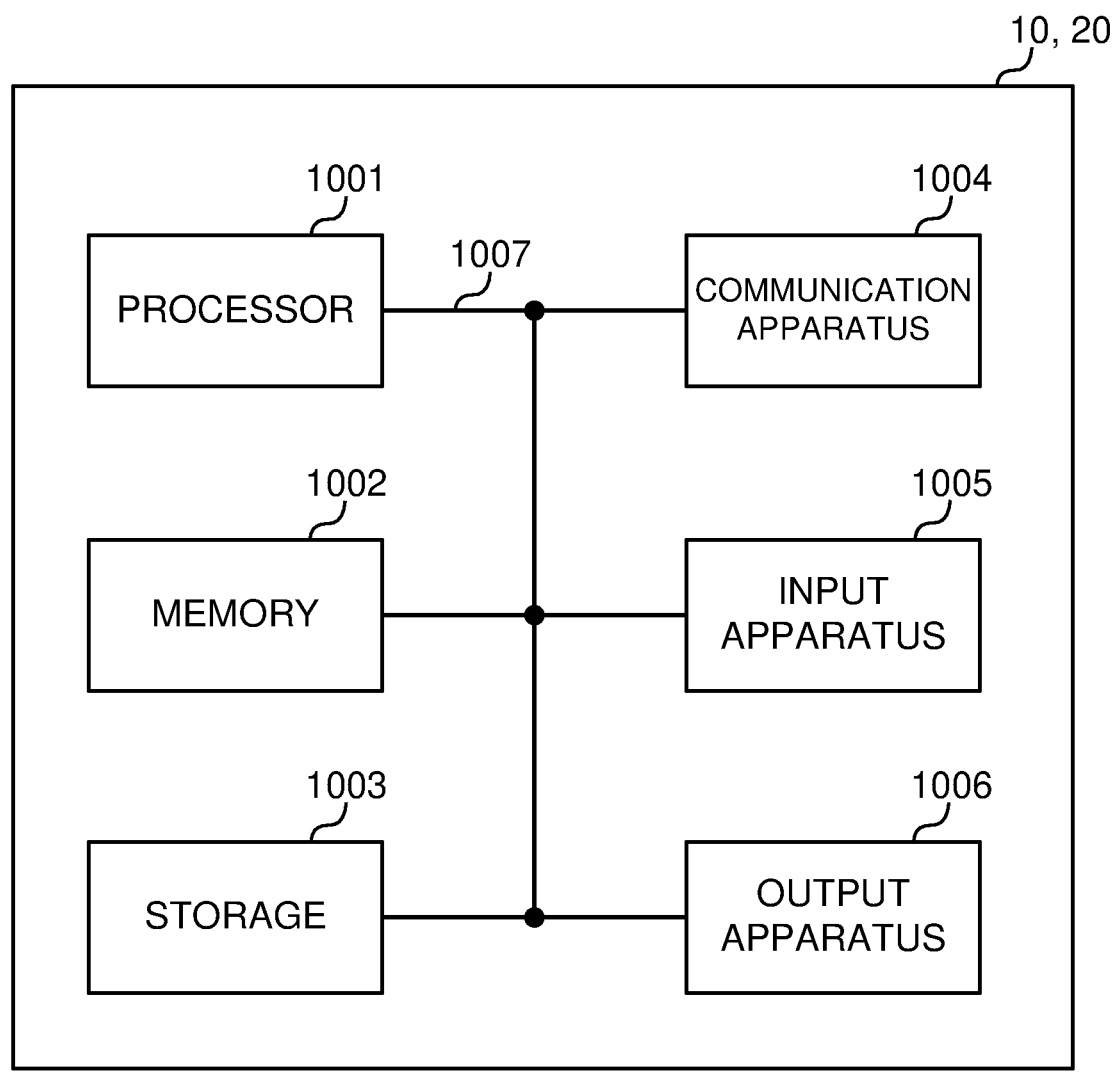
FIG. 10 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 10 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus (between apparatus).

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware (at least one of these hardware).

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/ channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiver that receives information indicating multiple transmission configuration indication (TCI) states for a same demodulation reference signal (DMRS) port for reception of a physical downlink shared channel (PDSCH); and
a processor that assumes that the DMRS port of the PDSCH is quasi co-located with reference signals of the multiple TCI states and uses, for the reception of the PDSCH, the multiple TCI states,
wherein, when a time offset between the PDSCH and downlink control information (DCI) scheduling the PDSCH is equal to or greater than a threshold and the DCI does not include a TCI field, the processor uses, for the reception of the PDSCH, a TCI state or a QCL assumption to be applied for a control resource set (CORESET) used in a physical downlink control channel (PDCCH) that transmits the DCI, and
wherein the information is an activation command that maps at least one codepoint of a TCI field of DCI to two TCI states, and wherein when a time offset between the DCI and the PDSCH is smaller than a threshold, the processor uses, for the reception of the PDSCH, TCI states corresponding to a lowest codepoint among codepoints to which the two TCI states are mapped in the activation command.

2. The terminal according to claim 1, wherein when a PDSCH transmission mode using the multiple TCI states for the DMRS port for the reception of the PDSCH is configured by higher layer signaling and the information is received, the processor uses, for the reception of the PDSCH, the multiple TCI states.

3. The terminal according to claim 2, wherein a configuration of the PDSCH transmission mode using the multiple TCI states for the DMRS port for the reception of the PDSCH is configured separately from a physical downlink control channel (PDCCH) transmission mode in which multiple TCI states are activated for one control resource set (CORESET).

4. The terminal according to claim 1, wherein the information is a first activation command that maps at least one codepoint of a TCI field of DCI to two TCI states, and wherein when the first activation command is received, the processor uses a first antenna port table, and when a second activation command that maps each codepoint for the TCI field of the DCI to one TCI state is received, the processor uses a second antenna port table that is different from the first antenna port table.

5. The terminal according to claim 1, wherein the processor performs reporting of capability information, and the capability information indicates that the terminal supports the multiple TCI states for the DMRS port for the reception of the PDSCH.

6. A radio communication method for a terminal, comprising:
receiving information indicating multiple transmission configuration indication (TCI) states for a same demodulation reference signal (DMRS) port for reception of a physical downlink shared channel (PDSCH); and
assuming that the DMRS port of the PDSCH is quasi co-located with reference signals of the multiple TCI states and using, for the reception of the PDSCH, the multiple TCI states,
wherein when downlink control information (DCI) scheduling the PDSCH does not include a TCI field and a time offset between the PDSCH and the DCI is equal to or greater than a threshold, a TCI state or a QCL assumption to be applied for a control resource set (CORESET) used in a physical downlink control channel (PDCCH) that transmits the DCI is used for the reception of the PDSCH, and wherein the information is an activation command that maps at least one codepoint of a TCI field of DCI to two TCI states, and wherein when a time offset between the DCI and the PDSCH is smaller than a threshold, TCI states corresponding to a lowest codepoint among codepoints to which the two TCI states are mapped in the activation command are used for the reception of the PDSCH.

7. A base station comprising:

a transmitter that transmits information indicating multiple transmission configuration indication (TCI) states for a same demodulation reference signal (DMRS) port for reception of a physical downlink shared channel (PDSCH) to a terminal; and a processor that assumes that the DMRS port of the PDSCH is quasi co-located with reference signals of the multiple TCI states and controls, using based on the multiple TCI states, transmission of the PDSCH, wherein when a time offset between the PDSCH and downlink control information (DCI) scheduling the PDSCH is equal to or greater than a threshold and the DCI does not include a TCI field, the terminal uses, for the reception of the PDSCH, a TCI state or a QCL assumption to be applied for a control resource set (CORESET) used in a physical downlink control channel (PDCCH) that transmits the DCI, and wherein the information is an activation command that maps at least one codepoint of a TCI field of DCI to two TCI states, and wherein when a time offset between the DCI and the PDSCH is smaller than a threshold, the terminal uses, for the transmission of the PDSCH, TCI states corresponding to a lowest codepoint among codepoints to which the two TCI states are mapped in the activation command.

8. A system comprising a terminal and a base station, wherein the terminal comprises:

a receiver that receives information indicating multiple transmission configuration indication (TCI) states for a same demodulation reference signal (DMRS) port for reception of a physical downlink shared channel (PDSCH); and a processor that assumes that the DMRS port of the PDSCH is quasi co-located with reference signals of the multiple TCI states and uses, for the reception of the PDSCH, the multiple TCI states, wherein when a time offset between the PDSCH and downlink control information (DCI) scheduling the PDSCH is equal to or greater than a threshold and the DCI does not include a TCI field, the processor uses, for the reception of the PDSCH, a TCI state or a QCL assumption to be applied for a control resource set (CORESET) used in a physical downlink control channel (PDCCH) that transmits the DCI, wherein the information is an activation command that maps at least one codepoint of a TCI field of DCI to two TCI states, and wherein when a time offset between the DCI and the PDSCH is smaller than a threshold, the processor uses, for the reception of the PDSCH, TCI states corresponding to a lowest codepoint among codepoints to which the two TCI states are mapped in the activation command, and the base station comprises:

a transmitter that transmits the information.

* * * * *